(12) United States Patent
Abedini et al.

(10) Patent No.: US 10,172,071 B2
(45) Date of Patent: Jan. 1, 2019

(54) DIRECTIONAL SYNCHRONIZATION IN ASSISTED MILLIMETER WAVE SYSTEMS

(71) Applicant: QUALCOMM Incorporated, San Diego, CA (US)

(72) Inventors: Navid Abedini, Raritan, NJ (US); Bilal Sadiq, Basking Ridge, NJ (US); Sundar Subramanian, Bridgewater, NJ (US); Muhammad Nazmul Islam, Edison, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/789,633

(22) Filed: Oct. 20, 2017

(65) Prior Publication Data

US 2018/0115990 A1 Apr. 26, 2018

Related U.S. Application Data

(60) Provisional application No. 62/411,416, filed on Oct. 21, 2016, provisional application No. 62/411,400, filed on Oct. 21, 2016.

(51) Int. Cl.
*H04W 48/12* (2009.01)
*H04W 76/10* (2018.01)
(Continued)

(52) U.S. Cl.
CPC .......... *H04W 48/12* (2013.01); *H04B 7/0617* (2013.01); *H04L 5/0051* (2013.01); *H04L 5/0053* (2013.01); *H04L 5/0094* (2013.01); *H04L 27/2655* (2013.01); *H04L 27/2666* (2013.01); *H04W 36/0083* (2013.01); *H04W 56/004* (2013.01); *H04W 74/006* (2013.01); (Continued)

(58) Field of Classification Search
None
See application file for complete search history.

(56) References Cited

U.S. PATENT DOCUMENTS

2003/0214914 A1 11/2003 Cain
2010/0029216 A1 2/2010 Jovicic et al.
(Continued)

FOREIGN PATENT DOCUMENTS

EP 2793526 A1 10/2014
WO 2009151291 A2 12/2009

OTHER PUBLICATIONS

International Search Report and Written Opinion—PCT/US2017/057753—ISA/EPO—dated Mar. 13, 2018.
(Continued)

*Primary Examiner* — Rebecca E Song
(74) *Attorney, Agent, or Firm* — Patterson & Sheridan, L.L.P.

(57) ABSTRACT

Certain aspects of the present disclosure provide techniques for assisted power control for an uplink signal transmitted during a RACH procedure. A UE may determine a transmit power for transmitting a message during a RACH procedure with a secondary BS, based at least in part, on communication between the UE and a primary BS. The UE may transmit the message to the second BS during the RACH procedure based, at least in part, on the determined transmit power.

28 Claims, 15 Drawing Sheets

(51) Int. Cl.
*H04B 7/06* (2006.01)
*H04L 27/26* (2006.01)
*H04L 5/00* (2006.01)
*H04W 56/00* (2009.01)
*H04W 74/00* (2009.01)
*H04W 36/00* (2009.01)
*H04W 76/15* (2018.01)
*H04W 72/04* (2009.01)
*H04W 52/04* (2009.01)
*H04W 16/28* (2009.01)

(52) U.S. Cl.
CPC ........... *H04W 76/10* (2018.02); *H04W 76/15* (2018.02); *H04W 16/28* (2013.01); *H04W 52/04* (2013.01); *H04W 56/003* (2013.01); *H04W 72/0406* (2013.01); *H04W 74/002* (2013.01)

(56) References Cited

U.S. PATENT DOCUMENTS

| | | |
|---|---|---|
| 2011/0237261 A1 | 9/2011 | Meshkati et al. |
| 2011/0243095 A1 | 10/2011 | Chin et al. |
| 2012/0163305 A1* | 6/2012 | Nimbalker ........ H04W 52/0206 370/329 |
| 2012/0243638 A1 | 9/2012 | Maltsev et al. |
| 2013/0182683 A1 | 7/2013 | Seol et al. |
| 2014/0204846 A1 | 7/2014 | Maltsev et al. |
| 2016/0050050 A1 | 2/2016 | Kang et al. |
| 2016/0095077 A1* | 3/2016 | Kwak .................. H04J 11/0079 370/280 |
| 2016/0301517 A1 | 10/2016 | Da |
| 2016/0338039 A1* | 11/2016 | Van Der Velde ..... H04W 24/02 |
| 2017/0071023 A1* | 3/2017 | Kunz .................. H04W 76/025 |
| 2017/0201917 A1* | 7/2017 | Han ...................... H04W 36/08 |
| 2017/0207843 A1 | 7/2017 | Jung et al. |
| 2017/0288743 A1 | 10/2017 | Nam et al. |
| 2017/0339678 A1* | 11/2017 | Wei ...................... H04W 16/28 |
| 2017/0374703 A1* | 12/2017 | Sang .................... H04W 48/08 |
| 2018/0035396 A1 | 2/2018 | Stirling-Gallacher et al. |
| 2018/0115940 A1 | 4/2018 | Abedini et al. |

OTHER PUBLICATIONS

Partial International Search Report—PCT/US2017/057753—ISA/EPO—dated Jan. 10, 2018.

* cited by examiner

DIRECTIONAL SYNCHRONIZATION IN ASSISTED MILLIMETER WAVE SYSTEMS

CLAIM OF PRIORITY UNDER 35 U.S.C. § 119

The present Application for Patent claims benefit of U.S. Provisional Patent Application Ser. No. 62/411,416, filed Oct. 21, 2016 and U.S. Provisional Patent Application Ser. No. 62/411,400, filed Oct. 21, 2016, assigned to the assignee hereof and hereby expressly incorporated by reference herein.

BACKGROUND

Field of the Disclosure

Aspects of the present disclosure relate to wireless communications, and more particularly, to a base station (BS) assisting a user equipment (UE) in establishing initial access and data transmissions with another BS.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. These improvements may be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure relate to methods and apparatus for assisting a UE in performing initial access to a BS. As described herein, a first BS may communicate with at least one user equipments (UEs) in a first frequency spectrum, allocate resources to the at least one UE for participating in at least one of assisted directional initial access, beam management, mobility management, radio resource management (RRM), or radio link monitoring (RLM) in a second frequency spectrum, and provide configuration information to the at least one UE for at least one of a directional synchronization signal, a beam reference signal (e.g. CSI-RS), or a random access message (e.g. RACH preamble, message2, message3, or message4) to be transmitted as part of the assisted directional initial access, beam management, mobility management, RRM or RLM.

Certain aspects of the present disclosure relate to methods and apparatus for assisting a UE in performing at least one of initial access, beam management, RRM, or RLM by a UE. As described herein, the UE may communicate with a first base station (BS) in a first frequency spectrum, receive an allocation of resources and configuration information from the first BS for a at least one of a directional synchronization signal, a beam reference signal, or a random access message to be used by a second BS operating in a second frequency spectrum as part of at least one of an initial access, beam management, mobility management, RRM, or RLM procedures, wherein the configuration information is specific to the UE or to a set of UEs including the UE, and participate in the at least one of initial access, beam management, mobility management, RRM, or RLM procedures with the second BS in accordance with the configuration information.

Certain aspects of the present disclosure relate to methods and apparatus for a BS to participate in at least one of initial access, beam management, RRM, or RLM procedures with a UE. As described herein, the BS may determine an allocation of resources and configuration information for at least one of a directional synchronization signal, a beam reference signal, a random access message to be used by a user equipment (UE) and the BS in a first frequency spectrum as part of at least one of an initial access, beam management, mobility management, RRM, or RLM procedures, wherein the configuration information is specific to the UE or to a set of UEs including the UE participate in the at least one of initial access, beam management, mobility management, RRM, or RLM procedures with the UE in accordance with the configuration information.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
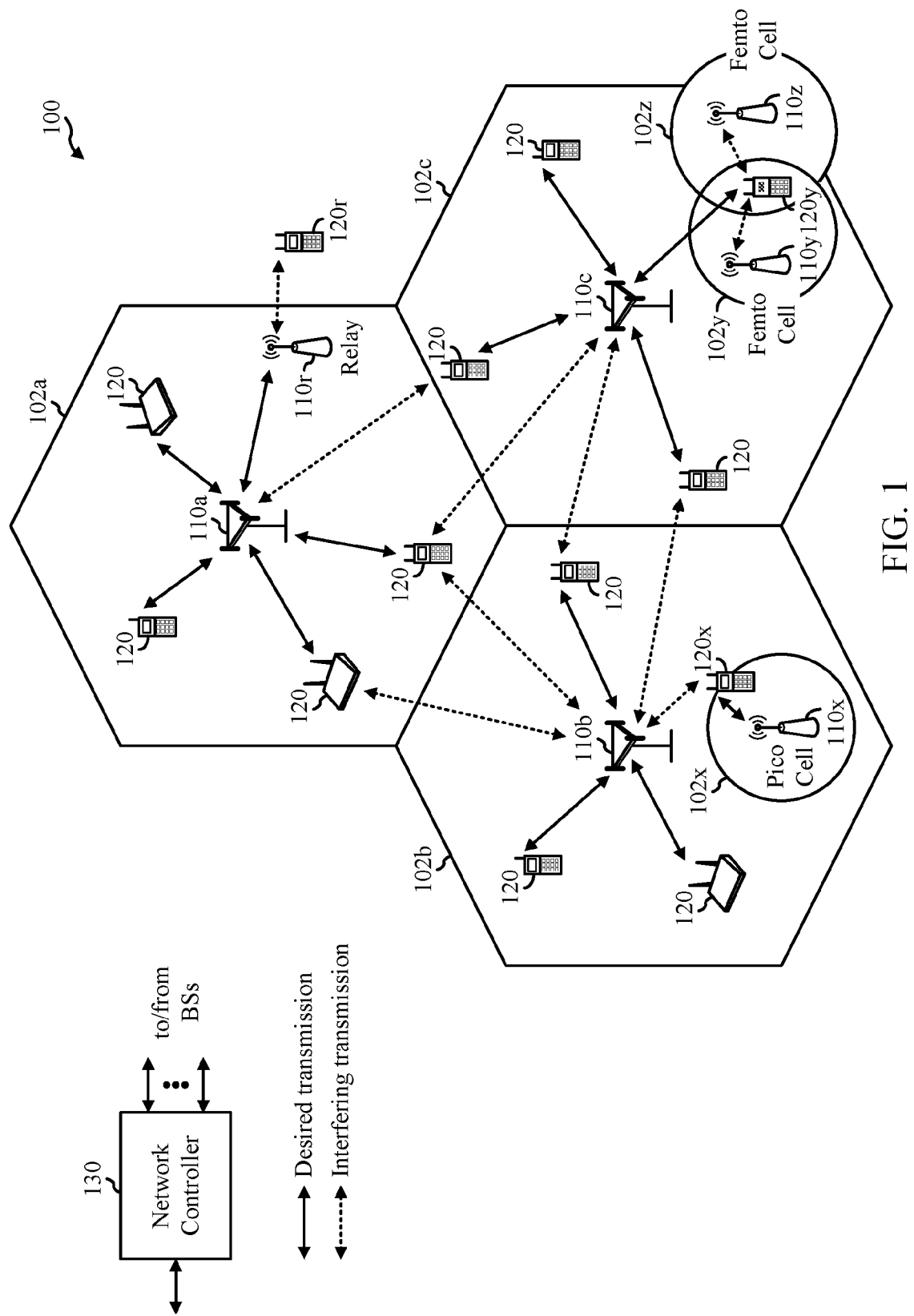
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. NR wireless communication systems may employ beams, where a BS and UE communicate via active beams. In scenarios where a BS may communicate with a UE using active beams, the UE may benefit from assistance in determining a transmit power to use for transmitting a message during a random access channel (RACH) procedure.

Aspects of the present disclosure provide techniques and apparatus for assisting a UE in determining a transmit power for use during a RACH procedure. According to one example, a UE may want to establish communication with a BS operating in a millimeter-wave (mmWave) frequency spectrum. The UE may receive assistance information for determining the transmit power to use during the RACH procedure from a BS operating in a lower frequency spectrum than the mmWave spectrum.

For illustrative purposes, aspects are described with reference to a primary BS and a secondary BS, wherein the secondary BS operates in an mmWave frequency spectrum and the primary BS operations in a lower frequency spectrum that the secondary spectrum; however, aspects may not be limited to this example scenario.

More generically, the UE may receive assistance information from one BS that may be used to determine power control for transmissions during a RACH procedure with another BS. The BS providing the assistance information may operate in a different frequency spectrum than the BS to which the UE transmits the RACH signaling using the determined power control.

Figure 8:
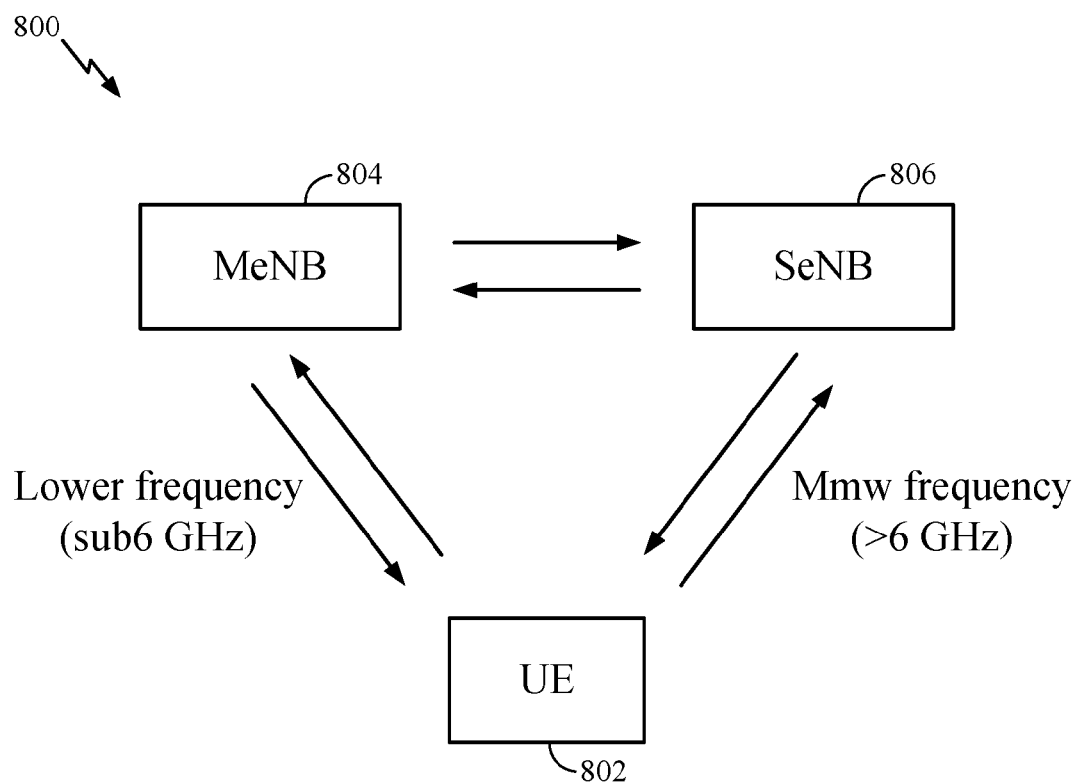
FIG. 8 illustrates an example wireless communication system, in which aspects of the present disclosure may be implemented.

As described herein, for example, with respect to FIG. 8, procedures related a UE communicating with a BS via multiple beams, such as initial access and data transmissions, including (but not limited to) beam management, mobility management, RRM, and/or RLM may be simplified with assistance from a BS operating in a lower frequency spectrum. With the assistance of the BS operating in a lower frequency spectrum, mmWave resources may be conserved and, in certain scenarios, initial synchronization to the mmWave network may be completely or partly bypassed.

UEs 120 may be configured to perform the operations 900 and methods described herein for determining a transmit power. BS 110 may comprise a transmission reception point (TRP), Node B (NB), 5G NB, access point (AP), new radio (NR) BS, Master BS, primary BS, etc.). The NR network 100 may include the central unit. The BS 110 may perform the operations 1000 and other methods described herein for providing assistance to a UE in determining a transmit power to use during a RACH procedure with another BS (e.g., a secondary BS).

A UE 120 may determine a transmit power for transmitting a message during a RACH procedure with a secondary BS, based at least in part, on communication between the UE and a primary BS. The UE may transmit the message to the secondary BS during the RACH procedure based, at least in part, on the determined transmit power.

A BS 110, such as a master BS or a primary BS, may communicate with the UE and may take one or more actions to assist the UE in setting a transmit power for transmitting a message during the RACH procedure with a secondary BS.

As illustrated in FIG. 1, the wireless network 100 may include a number of BSs 110 and other network entities. According to one example, the network entities including the BS and UEs may communicate on high frequencies (e.g., >6 GHz) using beams. One or more BS may also communicate at a lower frequency (e.g., <6 GHz). The one or more BS configured to operate in a high frequency spectrum and the one or more BS configured to operate in a lower frequency spectrum may be co-located.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
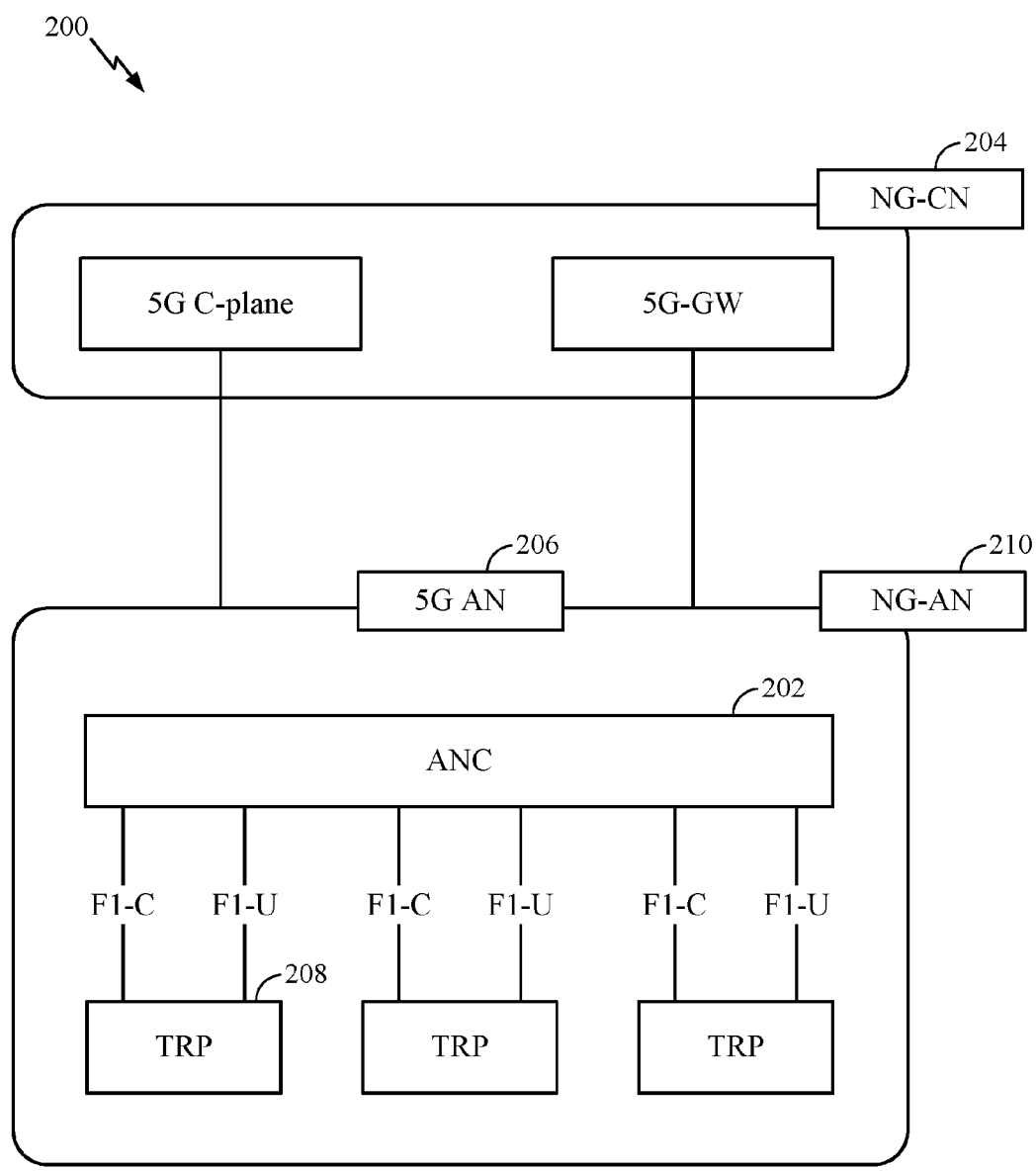
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
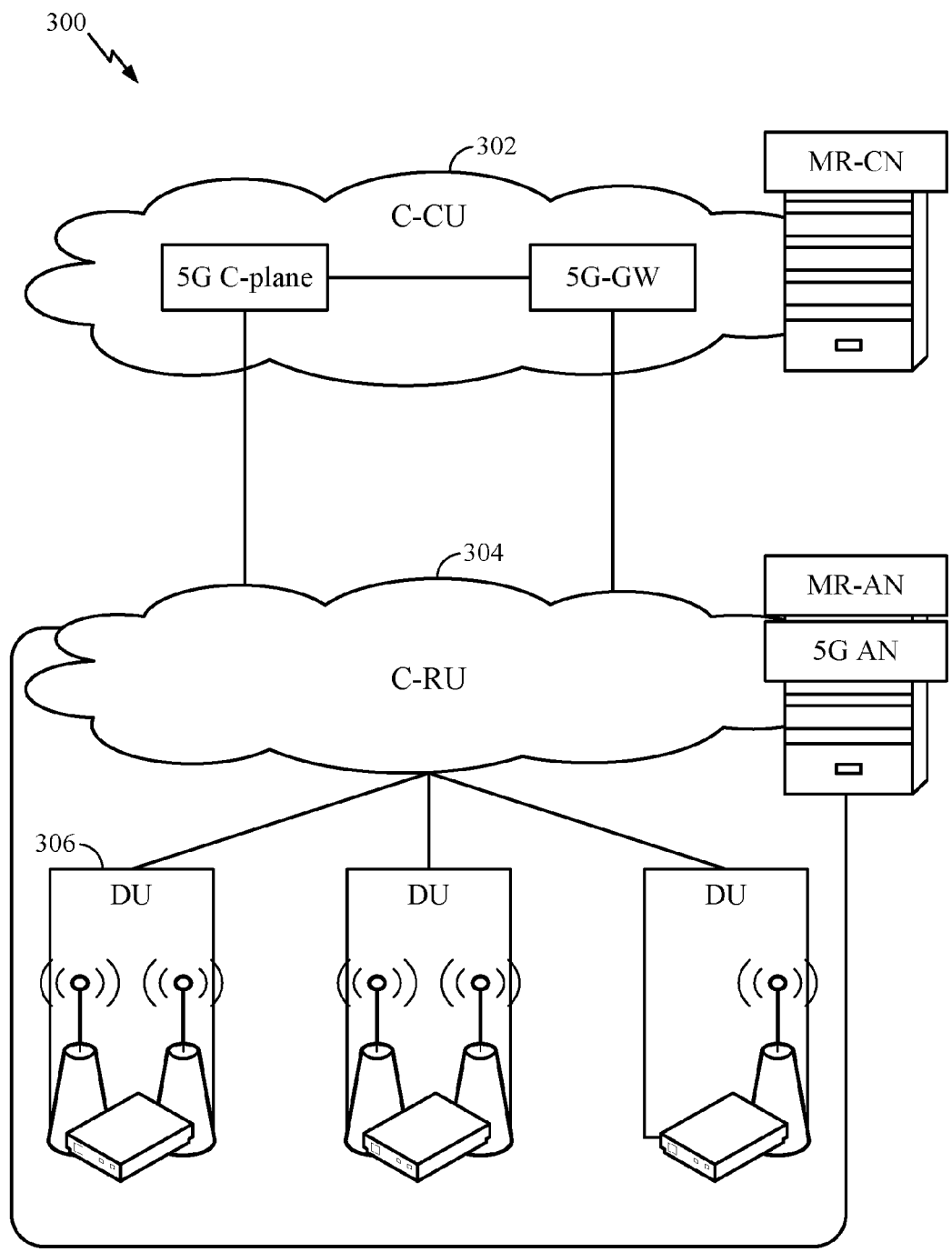
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
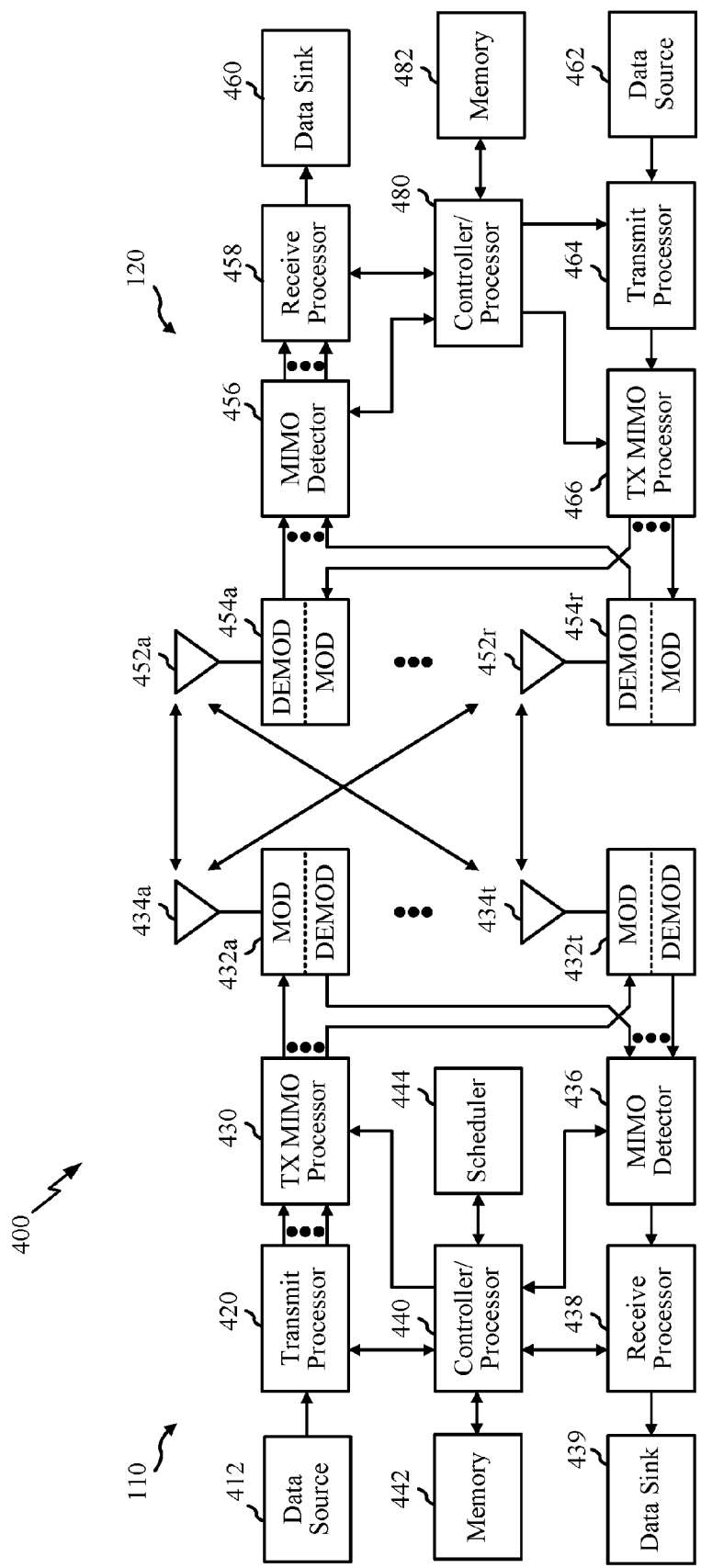
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). According to aspects, the Master BS may operate at lower frequencies, for example, below 6 GHz and a Secondary BS may operate at higher frequencies, for example, mmWave frequencies above 6 GHz. The Master BS and the Secondary BS may be geographically co-located.

One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 9, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
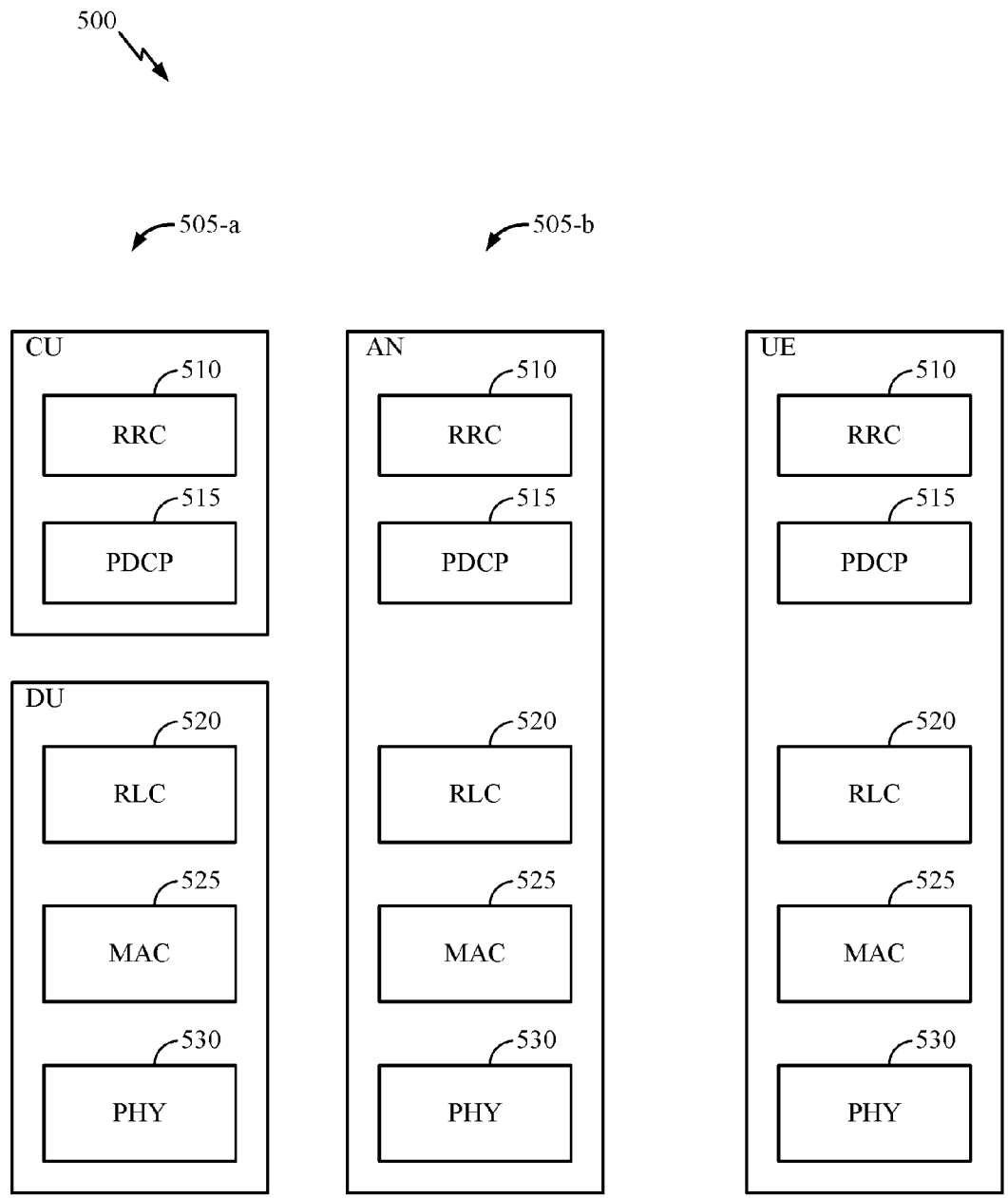
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
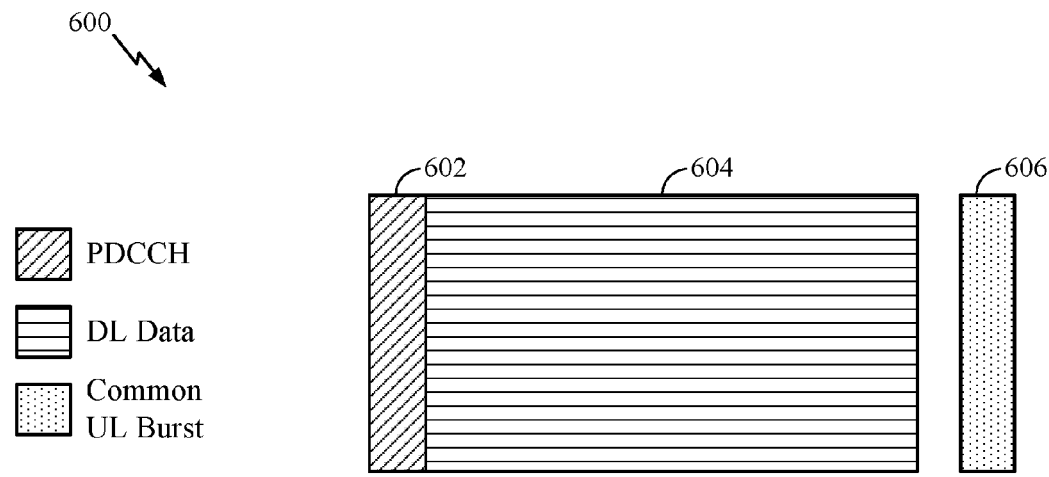
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
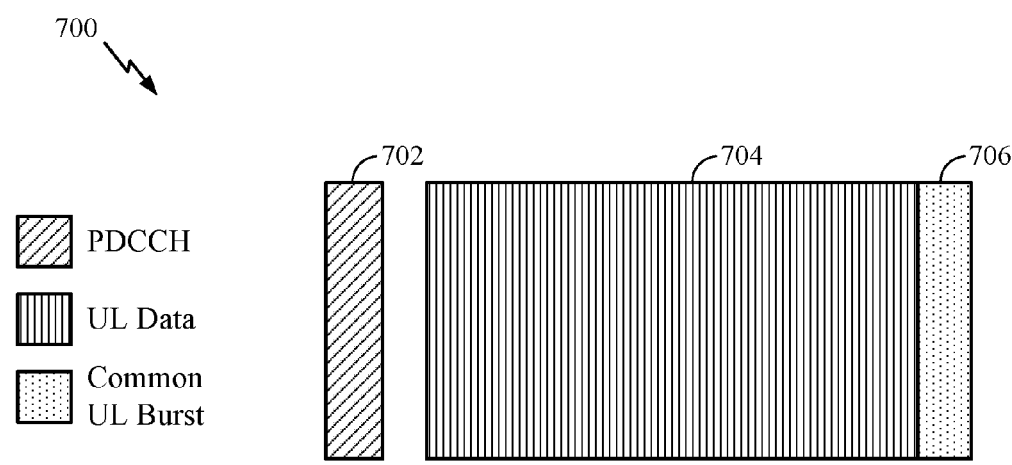
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Assisted MMwave Access

FIG. 8 illustrates an example 800 of an assisted mmWave access process (or a beam management, mobility management, radio resource management (RRM), or radio link monitoring (RLM) procedure). A UE 802 may want to access a BS 806. The BS 806 may be a secondary BS that for example operates in an mmWave spectrum. Another BS, such as BS 804, may assist the UE in accessing the BS 806. According to an example, BS 804 may be a primary BS that operates in a lower frequency spectrum as compared to the BS 806. The BSs 804 and 806 may communicate with each other. According to aspects, the BSs 804 and 806 may be co-located. The BS 806 and UE 802 may communicate with each other using beams.

In accordance with one or more aspects, the BSs 804 and 806 may use the same or different radio access technology (RAT), the same or different frequency band, and in some cases the BSs 804 and 806 may be the same BS. For example, in some cases, the BSs 804 and 806 may be in two neighboring cells using a same frequency and RAT such as a serving cell and neighbor cell that is helping. In another case the BSs 804 and 806 may use different carrier frequencies and/or RATs, for example one BS could use LTE and the other could use mmWave or NR, or one BS could use sub-6 GHz NR and the other could use mmWave NR. Further, in another example, the BSs 804 and 806 may be co-located in one BS configured to operate both sets of operations provided by the BSs 804 and 806 to communicate with a UE.

As described above, mmWave communication may be beam-formed, wherein wireless devices may communicate using directional beams. A UE 802 receiving assistance, from BS 804, in accessing the BS 806 may simplify access to the mmWave network. Additionally, assistance from the BS 804 may help conserve mmWave resources. The conserved resources may increase flexibility in the mmWave network. For example, the BS 806 may flexibly (e.g., dynamically) allocate directional synchronization and directional RACH resources per demands of UEs.

Typically, UE's initial access to a network may involve performing synchronization to acquire time, frequency, and system information of the serving BS. After synchronization, the UE may transmit a RACH preamble to identify itself to BS. The UE and BS may complete the initial access process by exchanging additional messages, including a Random Access Response (message 2), message 3, and 4 during a RACH procedure. According to aspects of the present disclosure, a UE 802 may advantageously not perform synchronization to the BS 806 prior to transmitting the RACH preamble.

Synchronization and random access (RACH) in an mmWave system may include the transmission and reception of beam-formed signals. Thus, synchronization and random access may be referred to as directional SYNC and directional RACH. Synchronization and random access in lower frequency wireless communication system may be referred to as SYNC and RACH.

Two modes of directional SYNC and directional RACH may exist: assisted directional SYNC/RACH and typical, directional SYNC/RACH. Assisted directional SYNC/RACH may involve assistance from a BS 804 (e.g. operating in a lower frequency than BS 806) in performing synchronization to/random access with the BS 806. The configuration of assisted directional SYNC/RACH may be UE-specific. In one or more cases, the configuration may include a beam reference signal configuration. Further, an example of a beam reference signal includes, but is not limited to, a channel state information reference signal (CSI-RS), which may be UE-specific. Typical directional SYNC/RACH may not include assistance from the BS 804. The configuration for typical, directional SYNC/RACH may be system/cell-specific and not UE-specific.

In some cases, two modes of RACH may exist: typical RACH (that may be used for initial access), and a dedicated RACH. The two modes of RACH may have different sets of resources and/or configuration. In one example, they may be allocated orthogonal sets of resources in at least one of a time (e.g. TDM), frequency (FDM), and code (CDM) spaces. Additionally/alternatively, the configuration of the dedicated RACH may be different from the other RACH in terms of at least one of a preamble sequence related parameter (e.g. root sequence, cyclic shift, preamble index), maximum number of transmissions, power control parameters (e.g. maximum number of power rampings, target received power, retransmission power ramping steps size), timer setting, association with other signals (e.g. synchronization and/or beam reference signals), and numerology. The dedicated RACH may be used for a different purpose than the other (typical) RACH. In one example, the dedicated RACH may be used for recovery from a beam failure event. In some examples, the dedicated RACH may be configured specifically for a UE. In another example, the two modes of RACH may be used by two groups of wireless nodes (UEs, relays, BSs), based on their categories and capabilities. In one example, the first mode may be used by the UEs in the system and the second mode by the relays.

In some cases, two modes of SYNC may exist: typical SYNC (that may be used for initial access) and a dedicated SYNC. The two modes of SYNC may have different sets of resources and/or configuration. In one example, they may be allocated orthogonal sets of resources in at least one of a time (e.g. TDM), frequency (FDM), and code (CDM) spaces. Additionally/alternatively, the configuration of the dedicated SYNC may be different from the other SYNC in terms of at least one of a sequence related parameter (e.g. root sequence, cyclic shift of a synchronization signal (a primary synchronization signal, a secondary synchronization signal, a tertiary synchronization signal, a timing or frequency refinement signal), a beam reference signal, a demodulation reference signal), a synchronization channel related parameters (e.g., content and configuration of a physical broadcast channel or a downlink control and data channel that carry part of the system information), numerology, beam sweep periodicity (e.g. sync burst set periodicity), number of signals transmitted within a window (e.g. within a period), the information carried by the signals, association with other signals (e.g. synchronization and/or beam reference signals), and the quasi-collocation (QCL) assumption. The dedicated SYNC may be used for a different purpose than the other SYNC. In one example, the dedicated SYNC may be used for one or more of a beam management, RRM, RLM, or access. In some examples, multiple dedicated SYNC may be configured (e.g. with different resources and/or configuration) for two or more different procedures. For example, the first dedicated SYNC may be configured for RRM and the second dedicated SYNC may be configured for RLM. In some examples, the dedicated SYNC may be configured specifically for a UE. In another example, the two modes of SYNC may be used by two groups of wireless nodes (UEs, relays, BSs), based on their categories and capabilities. In one example, the first mode may be used by the UEs in the system and the second mode by the relays.

As used herein, the term mmWave generally refers to spectrum bands in very high frequencies such as 28 GHz. Such frequencies may provide very large bandwidths capable of delivering multi-Gbps data rates, as well as the opportunity for extremely dense spatial reuse to increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies in which mmWave operates, the small wavelengths enable the use of a large number of antenna elements in a relatively small form factor. This characteristic of mmWave may be leveraged to form narrow directional beams that may send and receive more energy, which may help overcome the propagation/path loss challenges.

These narrow directional beams may also be utilized for spatial reuse. This is one of the key enablers for utilizing mmWave for mobile broadband services. In addition, the non-line-of-site (NLOS) paths (e.g., reflections from nearby building) may have very large energies, providing alternative paths when line-of-site (LOS) paths are blocked. Aspects of the present disclosure may take advantage of such directional beams, for example, when a UE performs initial access, beam management, mobility management, RRM, and/or RLM with a mmWave base station (e.g., and SeNB).

In some cases, the assisted access process may be provided between a variety of different wireless nodes/device combinations that are not limited to that which is shown in FIG. 8. For example, the wireless nodes may include a set of at least two wireless nodes that include any combination of one or more of a gNBs, a relay(s), and a UE(s). Accordingly, the assisted access process may be provided over a number of different communication implementations that depend from the specific wireless devices selected. For example, the communication may be any one of backhaul (BH), integrated access and backhaul (IAB), and/or D2D communication between two UEs. IAB may include the sharing of the same technology and the same resources shared between access links and/or backhaul links. In some cases, a UE may operate and provide communication abilities of a BS.

Example Directional Synchronization in Assisted Millimeter Wave Systems

In assisted mmWave access, different modes of operation may exist based on the level of involvement of a primary BS.

In one example, the primary BS may provide a UE with a minimum amount of information for transmitting a directional RACH preamble to a secondary BS.

With reference to FIG. 8, the BS 804 may provide the UE 802 with a minimum amount of information, such as the time/frequency resources for directional RACH transmission and directional RACH preamble configuration (e.g., choices of Zadoff-Chu root/cyclic shift, or the subcarrier spacing), association between RACH resources and SYNC or beam reference resources or configuration, configuration of message2 of RACH (e.g., choice of subcarrier spacing for message2) for use in communicating with the BS 806. In one example, at least part of these resources and configurations are UE-specifically determined. For example, some time/frequency resources for RACH transmission may be dedicated to the UE. According to certain aspects of the present disclosure, the UE 802 may, advantageously, not perform directional SYNC to the BS 806. The UE may bypass at least part of the synchronization procedure because of the assistance received from the BS 804.

Figure 9:
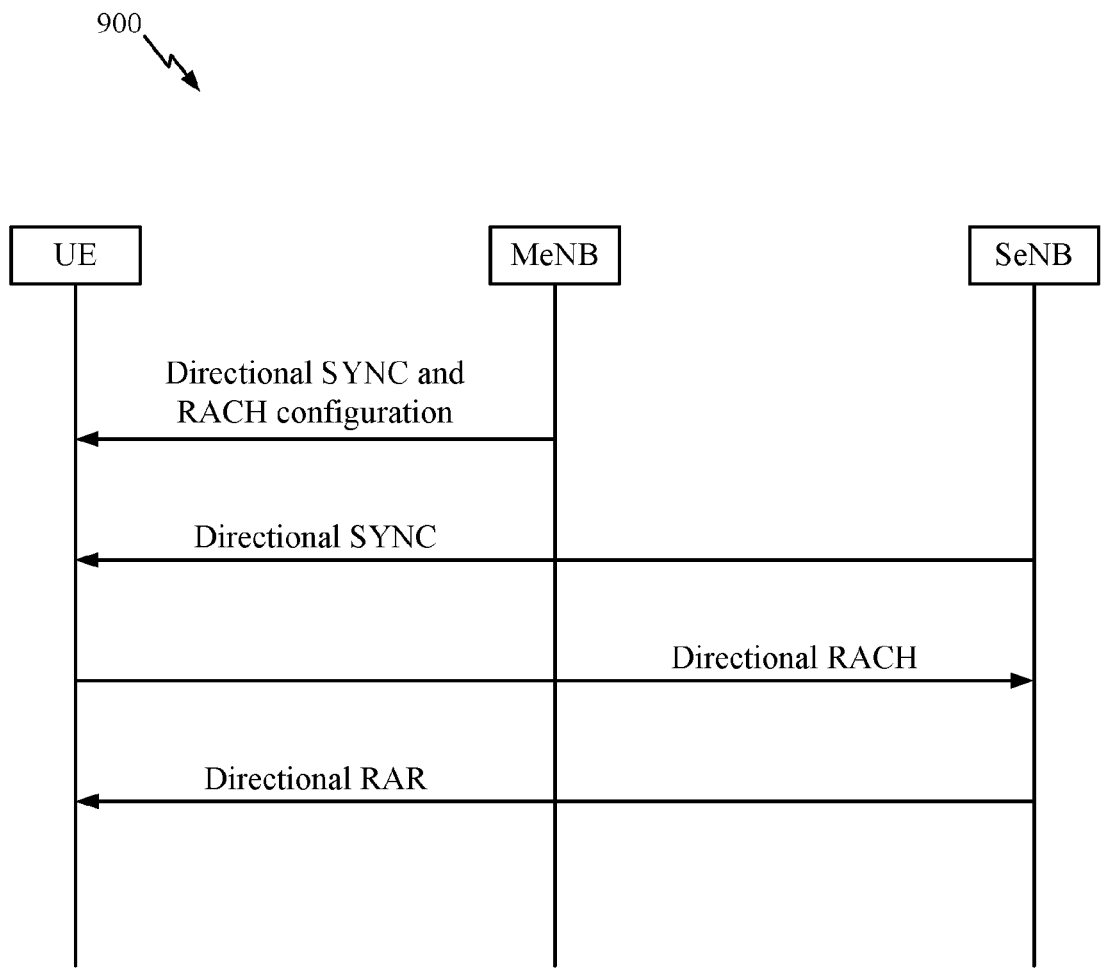
FIG. 9 illustrates an example of assisted initial access in a millimeter wave system, in accordance with certain aspects of the present disclosure.
Figure 10:
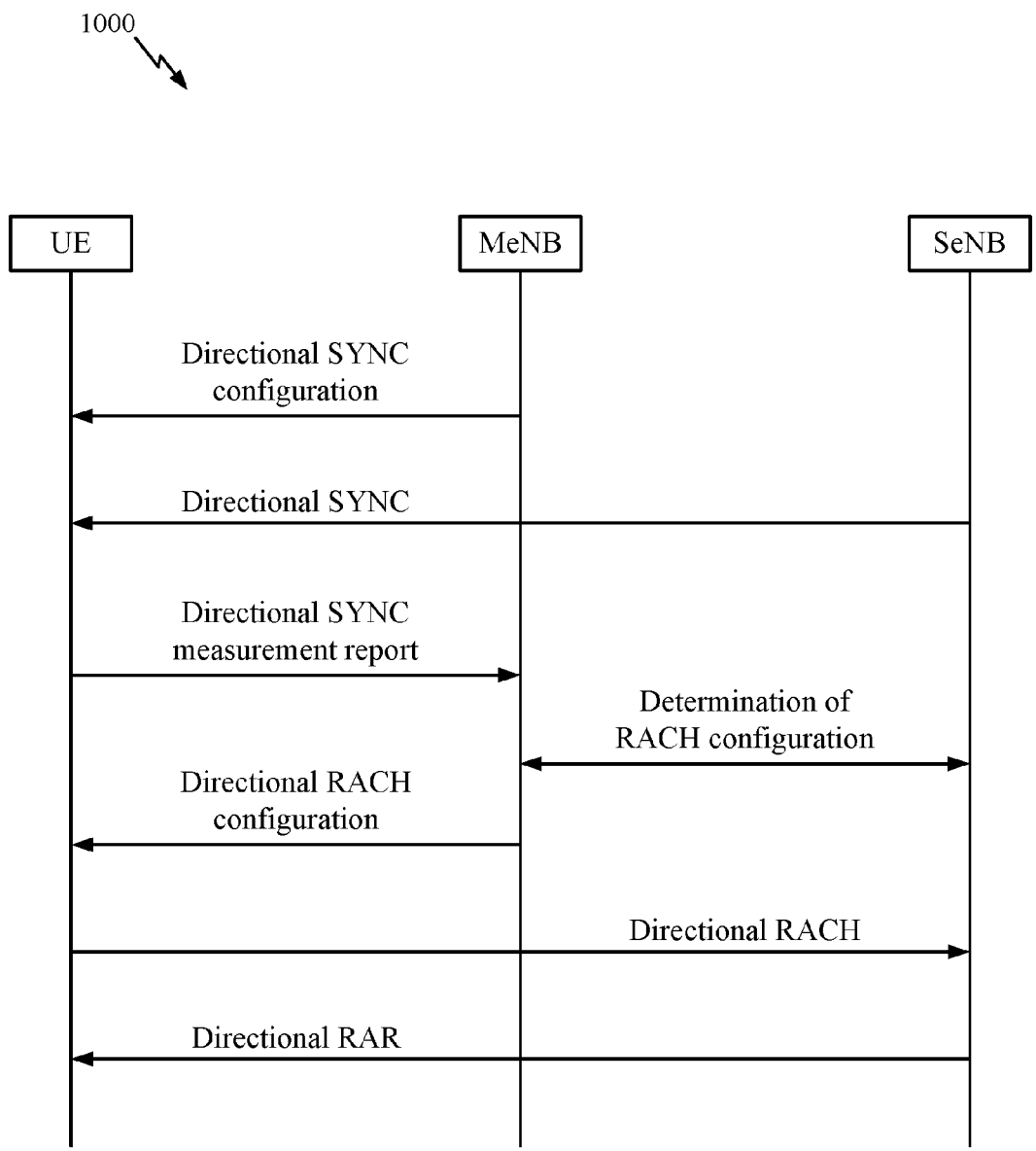
FIG. 10 illustrates another example of assisted initial access in a millimeter wave system, in accordance with certain aspects of the present disclosure.

In an assisted mmWave initial access procedure, there may be different operation modes, for example, based on the level of MeNB involvement. In one method, the MeNB may at least provide directional SYNC configuration information to the UE to facilitate its directional synchronization procedure. The directional SYNC signal may include, for example, any combination of signals, such as sync reference signals (e.g., such as PSS/SSS) or beam measurement reference signals (beam "MRS" or "BRS"). FIGS. 9 and 10 illustrate two examples of different operation modes for mmWave assisted initial access. In one or more cases, the operation modes may be used for beam management, mobility management, RRM, and/or RLM.

For example, FIG. 9 illustrates a first mode of operation for assisted initial access that may be referred to as Operation Mode A.

As illustrated, in this mode of operation, an MeNB provides directional SYNC/RACH configuration information to the UE. This information may include, for example, at least time/frequency resources for the UE to use for directional initial access (e.g., a measurement window to monitor and receive directional SYNC and/or beam reference signals). An example of a beam reference signal includes, but is not limited to, a channel state information reference signal (CSI-RS). In one or more cases a CSI-RS may be UE-specific. The configuration information may also include beam sweep periodicity of the SYNC signal (e.g., a synchronization burst set periodicity indicating how often transmit beam directions are changed). The configuration information may also include an indication of a set of SYNC and/or beam reference signals that are transmitted within the indicated time/frequency resources (e.g., measurement window) and may be used by the UE for at least one of an access, beam management, mobility management, RRM, and/or RLM procedures.

The configuration information may also include SYNC-RACH resource pair mapping (e.g. the association between RACH resources and synchronization signals, or the association between RACH resources and CSI-RS), quasi-collocated (QCL) information (information regarding QCL) of at least a subset of sync signals, beam reference signals (CSI-RS), and/or RACH messages with each other or with other reference signals or channels (e.g. QCL indication of two or more sync signals transmitted within a beam sweep period, QCL indication of sync signals on a first frequency band with sync signals on a second frequency band). The assumption may indicate any level of QCL with respect to different parameters, including spatial QCL, QCL with respect to average delay, delay spread, and/or Doppler shift or Doppler spread). The configuration may also include SYNC-RACH reciprocity assumption, and/or a numerology (e.g., carrier spacing and/or cyclic prefix of at least one of synchronization signals and channels, CSI-RS, RACH message1, message2, message3, or message4). The configuration may also indicate that the timing and synchronization of MeNB may be used to acquire at least part of the timing and synchronization of the SeNB.

The configuration information may also include one or more parameters associated with the beam reference signals (e.g. CSI-RS) including, transmission periodicity, transmission bandwidth, time/frequency resource locations, parameters for sequence generation, numerology, association with synchronization signals, QCL (e.g., spatial QCL) indication (e.g. via a state parameter or and index to a table).

The resource pair mapping may indicate, for example, what resources for a UE to use for sending a RACH transmission based on a received SYNC signal. For example, the resources used for the RACH transmission may indicate a best beam direction for the received SYNC signal (e.g., and the SeNB may select a transmit direction accordingly for future communications). The SYNC-RACH reciprocity assumption indication may indicate whether a UE can assume SYNC-RACH reciprocity, for example, allowing the UE to determine the beam direction for the transmission of the RACH signal based on the beam direction of the received SYNC signal.

As illustrated in FIG. 9, during initial access according to operation mode A, the UE may acquire the directional SYNC signal. Acquiring the directional SYNC signal may involve one or more of acquiring time/frequency synchronization (e.g. when MeNB and SeNB(s) are not synchronized), acquiring the system information, or acquiring the beam state information (finding the quality (or the best) of Tx/Rx beam pair(s)).

After acquiring the SYNC signal, the UE then transmits a directional RACH preamble based on the provided configuration information and the acquired SYNC signal. The UE may then receive a random access response (RAR) and complete the random access process with SeNB. In one or more cases, at least part of the operation mode shown in FIG. 9 may be used for beam management, mobility management, RRM, and/or RLM.

FIG. 10 illustrates a second mode of operation for assisted initial access that may be referred to as Operation Mode B.

In this mode, however, the MeNB may provide a different level of support. For example, as illustrated, in this mode of operation, the MeNB may provide (only) directional SYNC configuration information to the UE. This information may include, for example, time/frequency resources for the UE to use for directional initial access (e.g., to receive directional SYNC and/or beam reference signals (e.g. CSI-RS)), the beam sweep periodicity of the SYNC signal, a numerology of the SYNC signal, QCL indication of synchronization or beam reference signals, and an indication of transmitted synchronization, or beam reference signals that can be used by the UE.

During initial access according to operation mode B, the UE may acquire the directional SYNC signal using the configured resources/parameters. Rather than immediately send the directional RACH, however, the UE may first send a measurement report (with a result of measuring) to MeNB including various information based on reception of the directional SYNC and/or beam reference signals (e.g., cell id, Tx/Rx beam id, beam state/quality).

The MeNB may coordinate with the SeNB(s) to determine the RACH configuration based on the submitted measurement report(s). The MeNB may then send a directional RACH configuration message which may include, for example, one or more selected cell IDs, RACH resources, Tx/Rx beam id, RACH preamble information, RACH Tx power information, RACH resource association with one or more of synchronization and beam reference signals, and/or numerology of RACH messages. In one or more examples, the directional RACH configuration may be provided from the MeNB to the UE via a handover message.

The UE and SeNB may then complete random access process based on the provided configuration. In one or more cases, at least part of the operation mode shown in FIG. 10 may be used for beam management, mobility management, RRM, and/or RLM.

Aspects of the present disclosure may help optimize such assisted initial access, beam management, mobility management, RRM, and/or RLM procedures. For example, according to certain aspects, the provided configuration/allocated resources of at least one of synchronization signals, beam reference signals (CSI-RS), RACH messages may be specifically configured for a UE and may be different from the common configuration resources.

Figure 11:
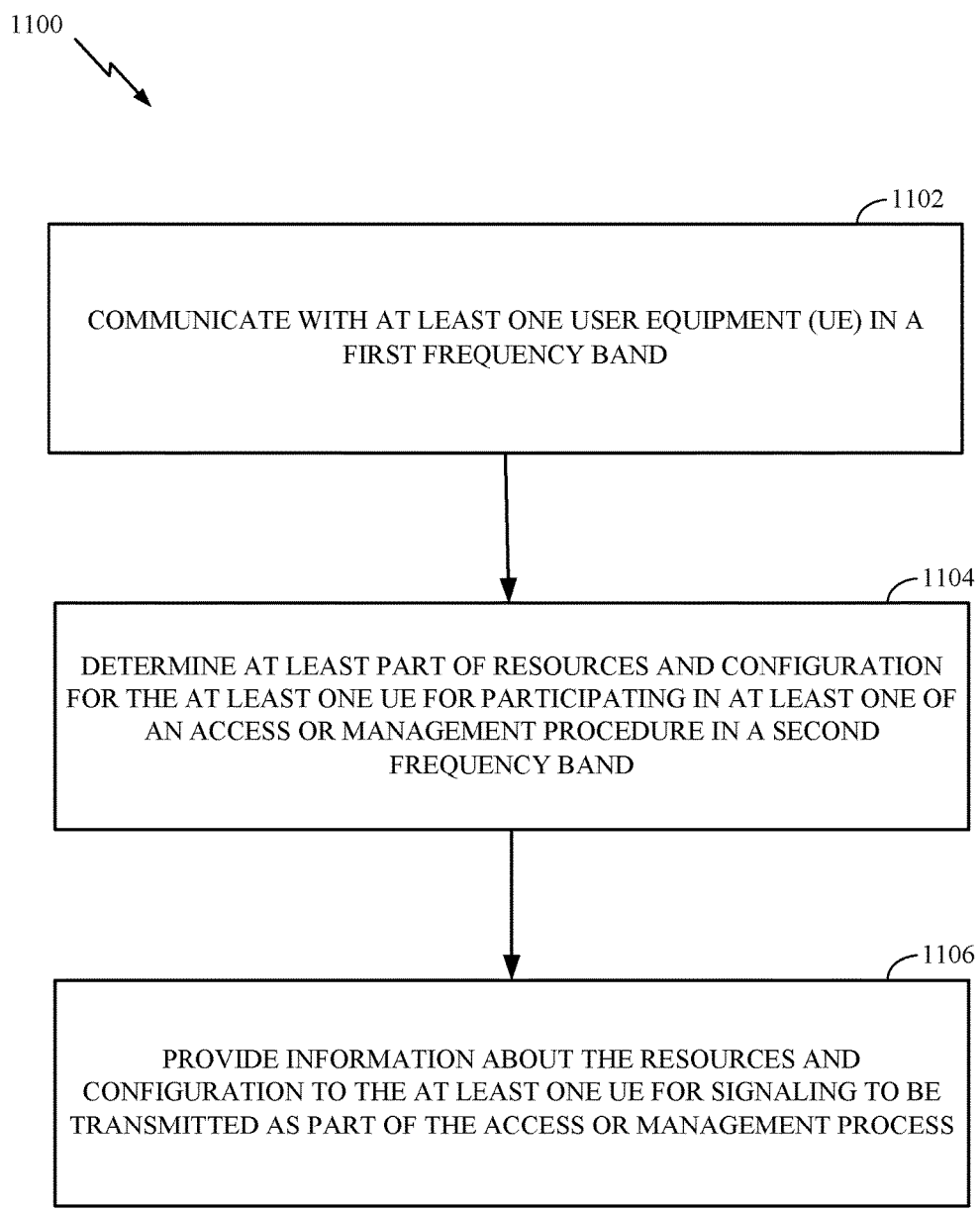
FIG. 11 illustrates example operations performed by a base station to assist a UE in initial access with another base station, in accordance with certain aspects of the present disclosure.
Figure 12:
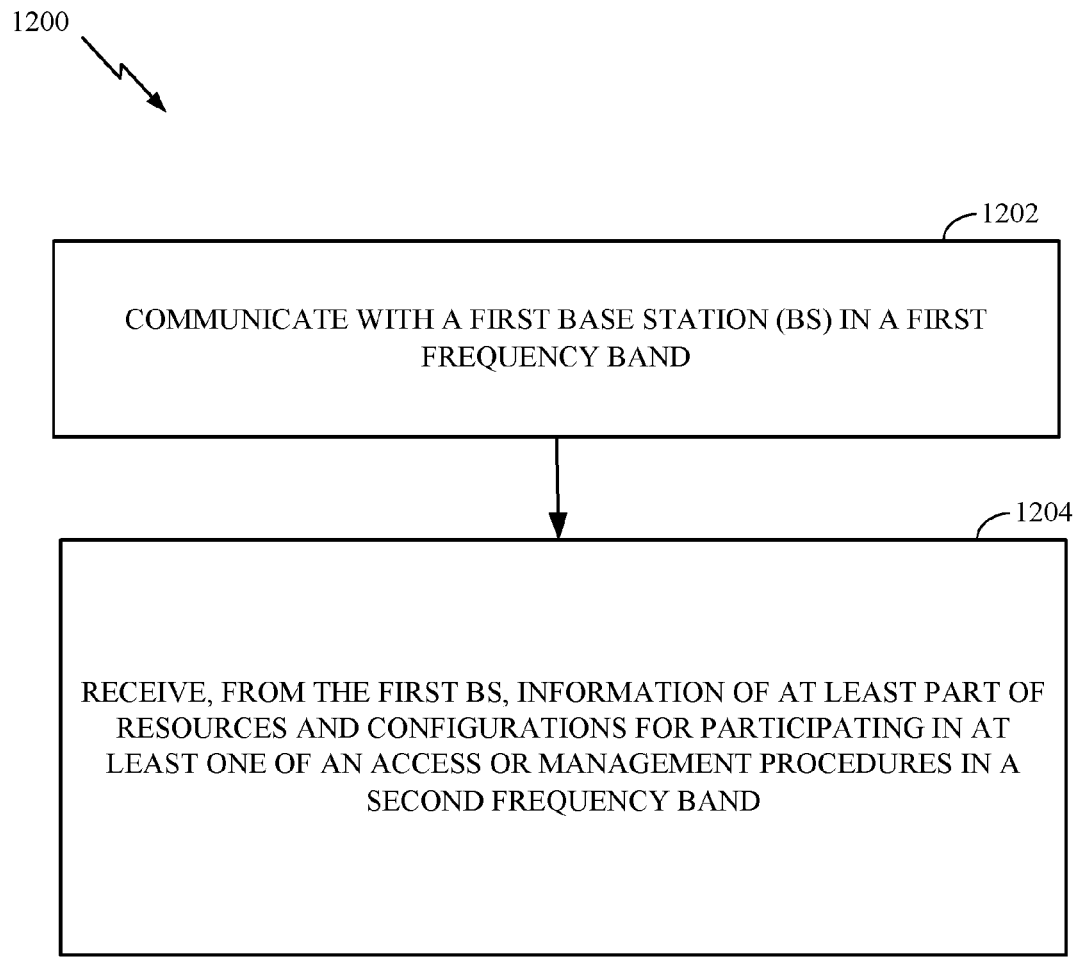
FIG. 12 illustrates example operations performed by a UE, in accordance with certain aspects of the present disclosure.
Figure 13:
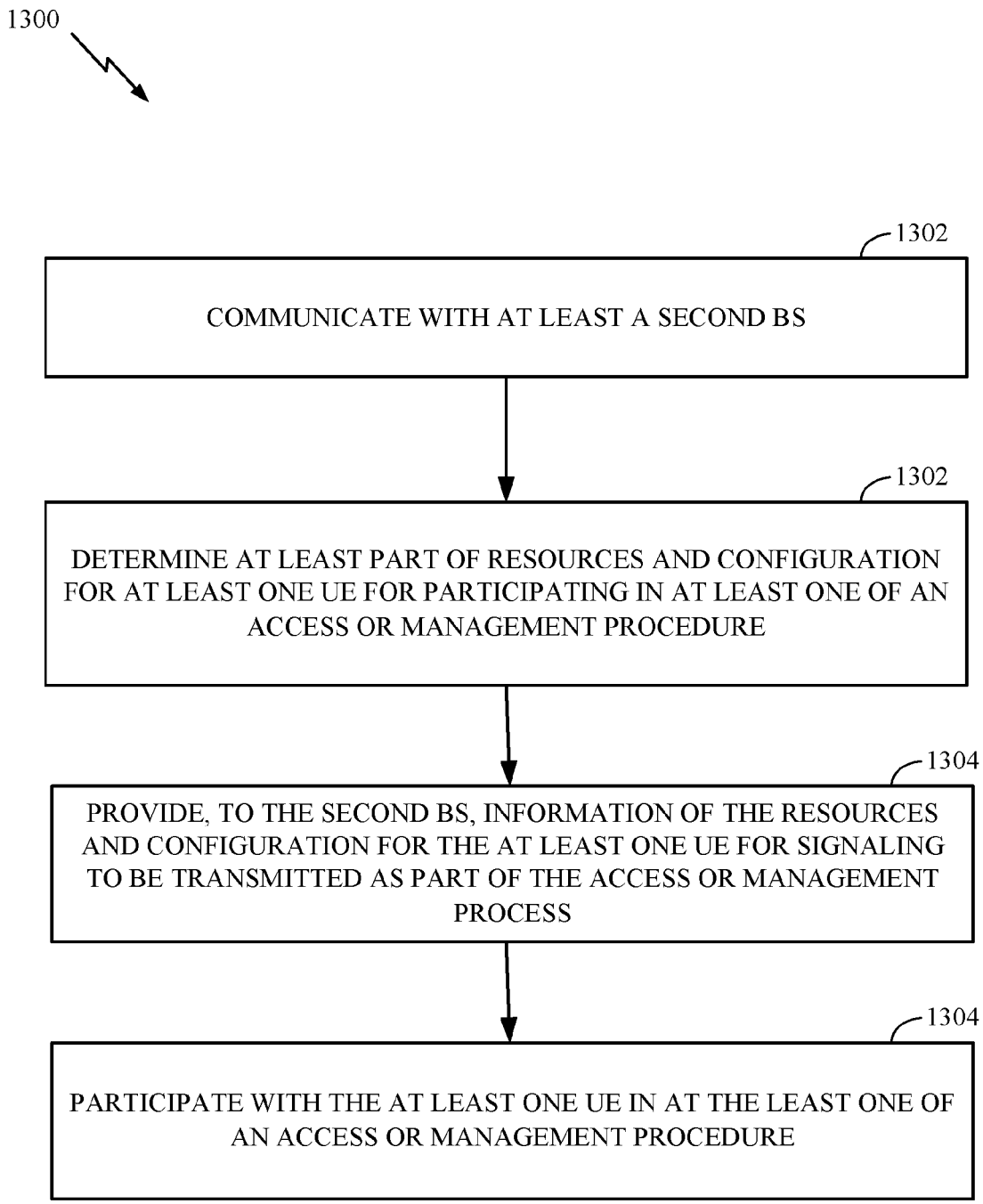
FIG. 13 illustrates example operations performed by a base station for initial access with a UE, in accordance with certain aspects of the present disclosure.

Such UE-specific configuration information may be signaled to the UE by MeNB (e.g. using some dedicated signaling like an RRC message). FIGS. 11-13 illustrate operations various entities involved in assisted directional initial access using such UE-specific configuration information.

For example, FIG. 11 illustrates example operations, which may be performed by BS, according to aspects of the present disclosure. The BS may include one or more modules of the BS 110 illustrated in FIG. 4. The BS 110 may be a primary BS (MeNB) that communicates with one or more UEs, for example, in a non-mmWave frequency spectrum.

At 1102, the primary BS communicates with at least one user equipments (UEs) in a first frequency band. At 1104, the primary BS determines at least part of resources and configuration for the at least one UE for participating in at least one of an access or management procedure in a second frequency band. At 1106, the primary BS provides information about the resources and configuration to the at least one UE for signaling to be transmitted as part of the access or management process. In some cases, the information provided via at least one of: a layer-1 signal, a media access control (MAC) control element (CE), a radio resource control (RRC) message, a broadcast channel, a control channel, or dedicated signaling.

In some cases, the primary BS may provide the information about the resources and configuration for the UE to participate in an access or management procedure in a second frequency band with a second BS (e.g., an SeNB). In other cases, UE assistance information may be provided by a single base station. As described herein, in some cases, the information provided may be UE-specific, whether a single or multiple base stations are involved. In the case a single BS is involved, that BS may provide UE-specific information to a UE to configure one or more (access or management) procedures and participate in the procedures with that UE itself.

In one or more cases, the first frequency spectrum may be equal to the second frequency spectrum. In some cases, the operations may be implemented for sub-6 GHz applications. Further, the procedures may be performed with either the primary BS or the second BS.

FIG. 12 illustrates example operations, which may be performed by UE, according to aspects of the present disclosure.

At 1202, the UE communicates with a first base station (BS) in a first frequency band. At 1204, the UE receives, from the first BS, information of at least part of resources and configurations for participating in at least one of an access or management procedures in a second frequency band. In some cases, the UE may receive the information of resources and configurations in response to signaling it sends. For example, a UE may receive the information after sending a request or a measurement report. The allocation of resources and configuration information from the first BS may be for signaling (e.g., at least one of a directional synchronization signal, a beam reference signal, or a random access message) to be transmitted by a second BS operating in a second frequency spectrum as part of at least one of an initial access, beam management, mobility management, radio resource management (RRM), or radio link monitoring (RLM) procedures, wherein the configuration information is specific to the UE or to a set of UEs including the UE. The directional synchronization signal comprises at least one of a primary synchronization (PSS), a secondary synchronization signal (SSS), a tertiary synchronization signal (TSS), a timing or frequency refinement signal (TRS), a demodulation reference signal (DMRS) for a synchronization channel. In some cases, the UE may transmit, to the first BS, an indication including at least one of a measurement report of one or multiple of synchronization signals and beam reference signals, a set of one or more cell identifiers of at least one other detected base station, a request, or a capability of the UE. At 1206, the UE participates in the at least one of an access or management process (e.g., assisted directional initial access, beam management, mobility management, RRM, or RLM) with the second BS in accordance with the configuration information. In one or more cases, the first frequency spectrum may be equal to the second frequency spectrum.

As noted above, in some cases, multiple base stations may be involved in the UE-assisted approach described herein. For example, a BS of a neighboring cell may communicate with a BS of another cell serving a UE to provide assistance information. FIG. 13 illustrates example operations, which may be performed, for example by a neighboring cell BS, according to aspects of the present disclosure. The BS may include one or more modules of the BS 110 illustrated in FIG. 4. The BS 110 may be a secondary BS (e.g., mmWave SeNB) that communicates with one or more UEs, for example, in a mmWave frequency spectrum.

At 1302, the secondary BS communicating with at least a second BS (e.g., MeNB). At 1304, the secondary BS determines at least part of resources and configuration for at least one UE for participating in at least one of an access or management procedure. As described herein, the resources and configuration may be UE-specific. At 1306, the secondary BS provides, to the second BS, information of the resources and configuration for the at least one UE for signaling to be transmitted as part of the access or management process. At 1308, the secondary BS participates with the at least one UE in at the least one of an access or management procedure.

As described herein, the resources and configuration information may be UE-specific. In some cases, the signaling may include at least one of a directional synchronization signal, a channel carrying at least part of system information, and the information may include at least one of a transmission periodicity, a beam sweeping periodicity, time and frequency resources used for the transmission of the signaling, one or more measurement windows to receive and measure a synchronization signal, a set of synchronization signals within a measurement window to measure, an indication of actually transmitted synchronization signals, quasi-collocated information of a synchronization signal with other signals or channels, indication of synchronization signal repetition within a beam sweeping period, subcarrier spacing, a sequence generation parameter for a synchronization signal.

In some cases, the secondary BS may configure one or multiple sets of UE-specific resources for the transmission of the synchronization signals for the at least one UE for one or multiple of an access, beam management, RRM, and RLM procedures. In some cases, the secondary BS may configure a UE-specific synchronization signal (TRS) for the at least one UE for maintaining and refining at least one of a timing and frequency synchronization.

In some cases, the signaling includes one or multiple beam reference signals (e.g. CSI-RS), and the information includes at least one of a transmission periodicity, a transmission bandwidth, a beam sweeping periodicity, time and frequency resources used for the transmission of the beam reference signals, one or more measurement windows to receive and measure beam reference signals, a set of beam reference signals within a measurement window to measure, quasi-collocated information of beam references signal with other signals or channels, subcarrier spacing, a sequence generation parameter for beam reference signals, number of antenna ports. In such cases, the secondary BS may configure one or multiple sets of UE-specific beam reference signals for the at least one UE for one or multiple of an access, beam management, RRM, and RLM procedures.

In cases where the access or management procedure includes a random access procedure, the resource and configuration information may be for a UE to use for sending at least one of a first random access message or a second random access message to be transmitted to the at least one UE. For example, the information may include at least one of a set of time and frequency resources for the transmission of the at least one of a first random access message and a second random access message, an association between the resources of the at least one of a first random access message and a second random access message with a set of at least one or multiple of a synchronization signal and a beam reference signal, a QCL configuration with respect to other signals and channels, a subcarrier spacing, a preamble id, a cyclic shift, a power control parameter, a max number of retransmissions of the first random access message, or a subcarrier spacing of the second random access message.

In some cases, (UE-specific) resources and configuration may be based at least on one of an indication from an upper layer, indication from the network, indication from a second BS, measurements of the first BS, a set of pre-determined configurations, indication from the at least one UE including at least one of a measurement report, a request, and UE's capability indication. The secondary BS may receive a first message from a second BS and the secondary BS may transmit a second message to the second BS, as a response to the first message, providing information of the at least part or resources and configurations. The secondary BS may determine the at least part or resources and configurations based at least on the first message. In some cases, the first message transmitted by the second BS may include at least one of a measurement report by the at least one UE, a request by the at least one UE, an indication of the at least one UE's capability.

Using UE-specific directional initial access configuration information, some resources may be allocated for directional SYNC transmission to one or multiple UEs (e.g., within a set), within which the mmWave eNB may transmit directional synchronization signal(s) based on some assisted directional SYNC configuration information.

In some cases, the configuration of the assisted directional SYNC signal may be different from the typical cell-based directional SYNC signal configuration. For example, the SYNC signal configuration may be determined along with the allocated resources and be specific to the UE(s). Such UE-specific information may be signaled to the UE by the MeNB. In some cases, there may be a preconfigured set of candidate configurations. In such cases, the UE may be provided an indication of one or multiple of the configurations in the pre-configured set.

As described herein, configuration information for a SYNC signal may refer to information related to the waveform of the SYNC and/or beam reference signals (e.g. CSI-RS). The configuration information may further include, for example, RACH and/or SS. Such information may include a PSS ID (e.g., a root of a Zadoff-Chu sequence used to generate PSS), SSS ID, and/or beam reference signal configuration.

Similarly, the allocated assisted directional SYNC resources may be different (in time and/or frequency) from the typical cell-based directional SYNC resources. In some cases, the SYNC resources may be specific to the UE(s) and based on their demands (e.g. traffic and/or service needs).

In some cases, UE-specific resources may be achieved by repurposing some resources used in common cell-based communications. For example, typical cell-based PDSCH/PUSCH resources may be re-purposed and allocated for assisted directional initial access.

As described above, beam management procedures may utilize a number of different RS types. For example, a configuration may be signaled using a UE specific CSI-RS. Particularly, an RS defined for mobility purposes in at least a connected mode may be utilized. The RS may be a NR-SS, a CSI-RS, or a newly designed RS but is not limited thereto. The CSI-RS may be specifically configured for a UE. In some cases, multiple UEs may be configured with the same CSI-RS. The signal structure for CSI-RS may be specifically optimized for a particular procedure. Further, CSI-RS may also be used for CSI acquisition. Other RS could also be considered for beam management such as DMRS and synchronization signals.

The assisted access process described above may be referred to as a non-standalone (NSA) case. To support adaptation in such cases, a network (NW) indication of information may be provided to connected and/or idle mode UEs, such as an SS burst set periodicity and information to derive measurement timing/duration (e.g., time window for NR-SS detection).

In some cases, properties or a configuration of synchronization signal (SS) or CSI-RS used for mobility may be signaled to a UE using dedicated signaling. In some cases, the NW may provide a parameter that is valid for CSI-RS resources associated with detected cells on a carrier frequency (e.g. based on UE measurement reporting). In some cases, CSI-RS configuration may be provided via UE specific signaling (e.g., in a handover command). In some cases, a serving cell may provide information that assists a UE in deriving the reference time of a target cell in a synchronous system.

In some cases, for contention-free access, dedicated RACH resources may be provided in the time domain different from resources used for contention-based access. For example, a UE may be configured to transmit multiple Msg.1 over dedicated multiple RACH transmission occasions in the time domain before the end of a monitored RAR window. In such cases, the multiple Msg.1 can be transmitted with the same or different UE TX beams.

As described herein, in some cases, multiple (two or more) sets of resources and configurations may be used for procedures such as RACH or SS transmission. The multiple sets may allow for dedicated RACH w/different time resources, dedicated RACH for beam failure recovery, UE-specific PRACH sequences, specific RACH configurations, TDM with other PRACH transmission, different QCL configurations (e.g., for SS/CSI-RS), and/or FDM or CDM with other PRACH transmissions. Multiple sets for SS transmissions may allow for a first set of SS signals for a first set of nodes (e.g. UEs) and a second set for a second set of nodes (e.g. relays). Different sets of resources may be used for different purposes (e.g. RLM, RRM, beam management, initial access), and they may additionally have UE-specific resource configurations.

Figure 14:
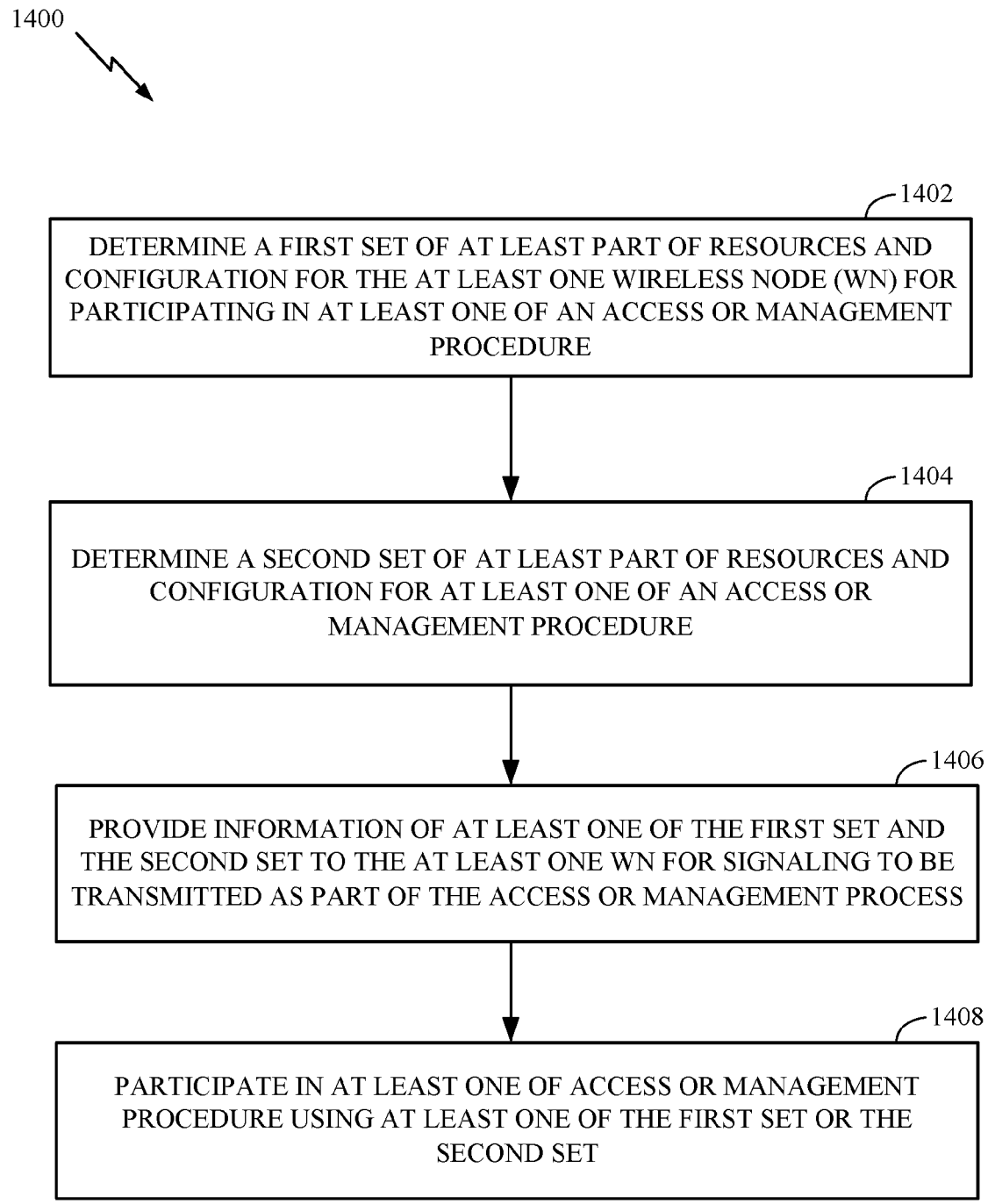
FIGS. 14-16 illustrate example operations for utilizing multiple sets of resources and configurations, in accordance with certain aspects of the present disclosure.
Figure 15:
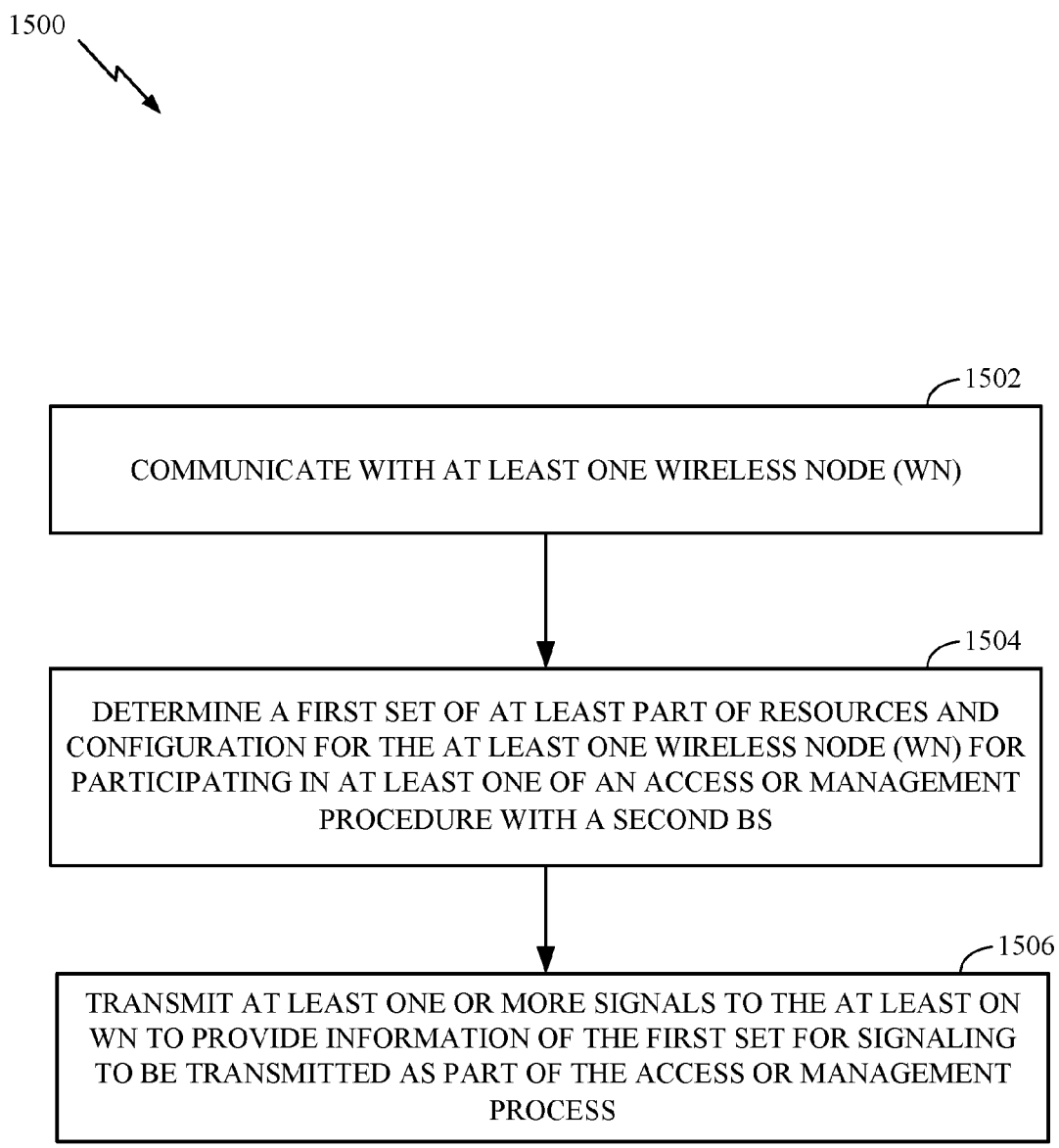
Figure 16:
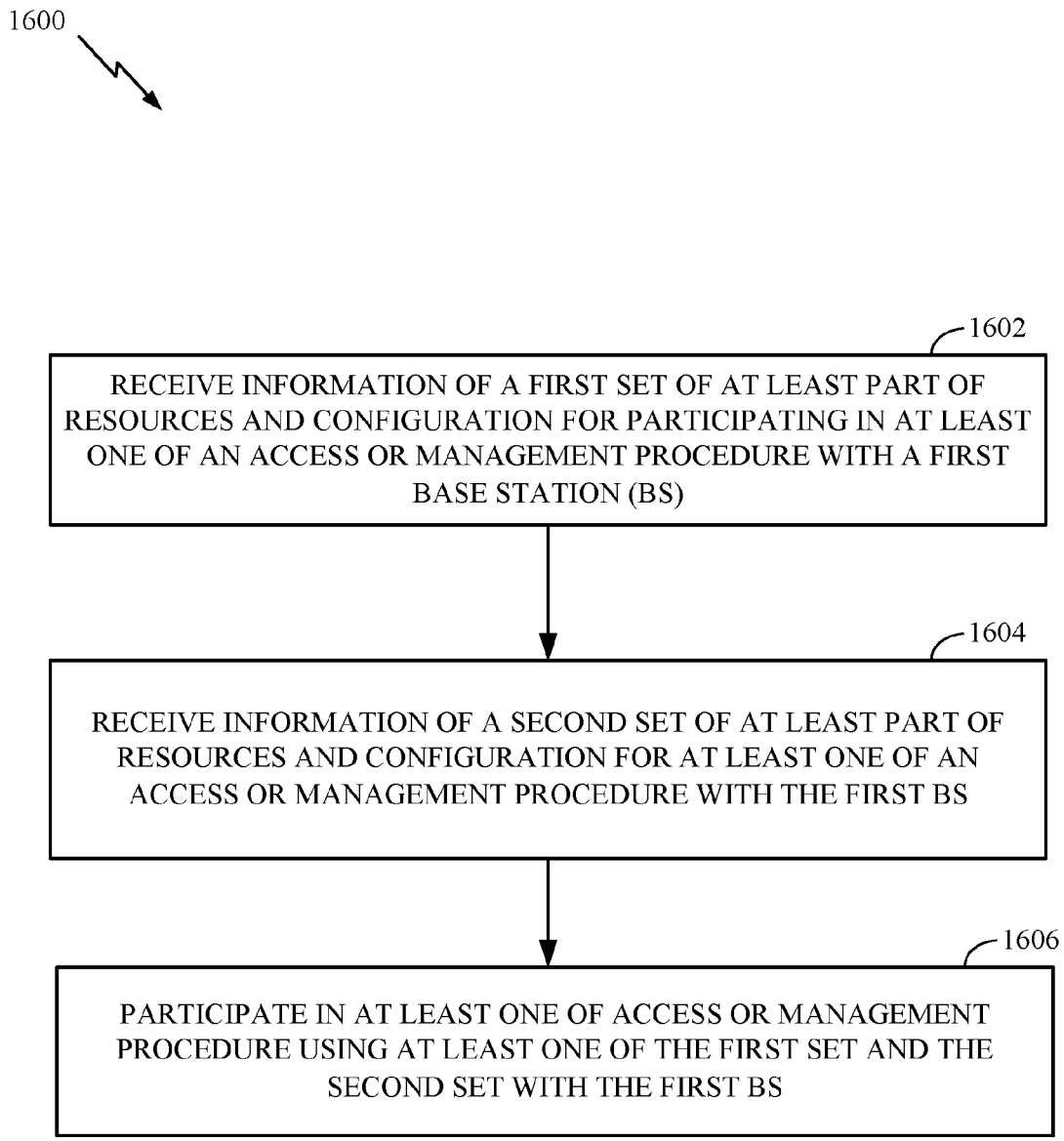

FIGS. 14-16 illustrate example operations that may be performed by a primary BS, a secondary BS, and a wireless node (WN) such as a UE or a relay, respectively, utilizing multiple sets of resources.

Operations 1400 of FIG. 14 begin, at 1402, by determining a first set of at least part of resources and configuration for the at least one wireless node (WN) for participating in at least one of an access or management procedure. At 1404, the primary BS determines a second set of at least part of resources and configuration for at least one of an access or management procedure. At 1406, the primary BS provides (directly or indirectly) information of at least one of the first set and the second set to the at least one WN for signaling to be transmitted as part of the access or management process. At 1408, the primary BS participates in at least one of access or management procedure using at least one of the first set and the second set.

Operations 1500 of FIG. 15 begin, at 1502, by communicating with at least one wireless node (WN). At 1504, the secondary BS determines a first set of at least part of resources and configuration for the at least one wireless node (WN) for participating in at least one of an access or management procedure with a second BS. At 1506, the secondary BS transmits at least one or more signals to the at least on WN to provide information of the first set for signaling to be transmitted as part of the access or management process.

Operations 1600 of FIG. 16 begin, at 1602, by receiving information of a first set of at least part of resources and configuration for participating in at least one of an access or management procedure with a first base station (BS). At 1604, the UE receives information of a second set of at least part of resources and configuration for at least one of an access or management procedure with the first BS. At 1606, the UE participates in at least one of access or management procedure using at least one of the first set and the second set with the first BS. In some cases, it is indicated to the UE when to use the first set and the second set, for example based on the procedure the UE is performing, the state of the UE, the operation mode of the UE, or the capabilities of the UE. In some cases, it is left to the UE to decide when to use the first set and the second set for participating in an access or management procedure with the first BS.

In some cases, the first set may include resources that were at least in part allocated for at least one of physical downlink shared channel (PDSCH) or physical uplink shared channel (PUSCH) resources. In some cases, the set may include resources that at least in part overlap with the resources of the second set. In other cases, the first and second set of resources may be non-overlapping. The first set may be configured specific to the at least one WN (e.g., a UE) or a plurality of WNs including the at least one WN, while the second set may be configured commonly in a cell specific manner.

In some cases, the first set is configured for a first category of WNs, and the second set for the second category of WNs, wherein the first category and the second category may differ in at least one of: capabilities, demands, states, modes of operation, procedures they are performing. The first category may be a set of UEs, and the second category may be a set of relays.

In some cases, the primary BS is communicating with at the least one WN, and providing the information is based on transmitting one or more signals to the at least one WN. In some cases, the primary BS may communicate with a second BS (e.g., a secondary BS), and provide the information to the second BS. In such cases, the primary BS may receive at least one or more first signals from the second BS and transmit at least one or more second signals to the second BS, as a response to the received one or more first signals, to provide the information. The primary BS may also determine the first set of resources and configurations at least in part based on the one or more first signals received from the second BS.

In some cases, participating in the at least one of access or management procedure comprises receiving or monitoring at least one of a first random access message and transmitting at least a second random access message in response to the first random access message. Accordingly, the first set and the second set are different in terms of at least one of: a transmission periodicity, a beam sweeping periodicity, one or more measurement windows to receive and measure a synchronization signal or a beam reference signal, a set of synchronization signals or beam reference signals within a measurement window to measure, an indication of actually transmitted synchronization signals a set of time and frequency resources for the transmission of the at least one of a first random access message and a second random access message, an association between the resources of the at least one of a first random access message and a second random access message with a set of at least one or multiple of a synchronization signal and a beam reference signal, a QCL configuration with respect to other signals and channels, a subcarrier spacing, a preamble id, a cyclic shift, a power control parameter, a max number of retransmissions of the first random access message, a subcarrier spacing of the second random access message, or the information comprises at least one of the above aspects. The first set of resources and configurations for the random access procedure may be configured for a beam failure recovery for the at least one WN, and the second set of resources and configuration is configured for a common random access procedure. The resources of the first set and the second set may be multiplexed in at least one of a frequency domain (FDM), time domain (TDM), code domain (CDM).

In some cases, the first set of resources and configurations may be configured for a dedicated random access procedure by the at least one WN, and the second set of resources and configuration may be configured for a common random access procedure. In such cases, the first set may occupy a different set of time resources than the second set.

The primary BS may determine at least part of resources and configuration (of the first and/or second set) based at least on one of: an indication from an upper layer, indication from the network, indication from a second BS, measurements of the first BS, a set of pre-determined configurations, indication from the at least one WN including at least one of a measurement report, a request, and WN's capability indication.

In some cases, the secondary BS may determine a second set of at least part of resources and configuration for at least one of an access or management procedure of the second BS and transmit at least one or more signals to the at least one WN to provide information of the second set for signaling to be transmitted as part of the access or management process.

In some cases, the UE may also communicate with the second BS, and receive at least one or more signals from the second BS indicating the information. The UE may also transmit at least one or more first signals to the second BS, including at least one of a request, a report of measurement of one or more synchronization signals and beam reference signals, capabilities of the WN, and receive the at least one or more signals from the second BS, as a response to the one or more first signals.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a first base station (BS), comprising:
communicating with at least one user equipment (UE) in a first frequency band;
determining at least part of resources and configuration for the at least one UE for participating in at least one of an access or management procedure comprising an assisted directional initial access in a second frequency band; and
providing information about the resources and configuration allocated for the assisted directional initial access that differ from configuration and resources allocated for non-assisted directional initial access to the at least one UE for signaling to be transmitted as part of the access or management process.

2. The method of claim 1, wherein:
the at least one of an access or management procedure further comprises at least one of: beam management, mobility management, radio resource management (RRM), or radio link monitoring (RLM); and
the signaling comprises at least one of a directional synchronization signal, a beam reference signal, a channel carrying at least part of a set of system information, or a random access message, wherein the directional synchronization signal comprises at least one of a primary synchronization (PSS), a secondary synchronization signal (SSS), a tertiary synchronization signal (TSS), a timing or frequency refinement signal (TRS), a demodulation reference signal (DMRS) for a synchronization channel.

3. The method of claim 1, wherein:
the resources and configuration is for the at least one UE to use when participating in the at least one of an access or management procedure in the second frequency band with a second BS, and
the signaling comprises at least one of a directional synchronization signal, a beam reference signal, a channel carrying at least part of a set of system information, a second random access message to be transmitted by the second BS, or a first random access message to be transmitted by the at least one UE to the second BS.

4. The method of claim 3, wherein:
the information comprises an indication to the at least one UE whether it can use timing of the first BS to acquire at least part of timing of the second BS.

5. The method of claim 3, wherein:
the at least one of an access or management procedure comprises a contention-free random access procedure with the second BS.

6. The method of claim 1, wherein:
the signaling comprises at least one of a directional synchronization signal, a beam reference signal, a channel carrying at least part of system information; and
the information comprises at least one of a transmission periodicity, a beam sweeping periodicity, time and frequency resources used for transmission of the signaling, one or more measurement windows to receive and measure a synchronization signal or a beam reference signal, a set of synchronization signals or beam reference signals to measure within a measurement window, an indication of actually transmitted synchronization signals, information regarding quasi-collocation of a synchronization signal or a beam reference signal with other signals or channels, an indication of synchronization signal repetition within a beam sweeping period, subcarrier spacing, a sequence generation parameter for a synchronization signal, or a beam reference signal.

7. The method of claim 1, wherein:
the at least one of an access or management procedure comprises a random access procedure; and
the signaling comprises at least one of a first random access message to be transmitted by the at least one UE or a second random access message to be transmitted to the at least one UE.

8. The method of claim 7, wherein the information comprises at least one of:
an indication of association between the resources of the at least one of a first random access message and a second random access message with a set of at least one or multiple of a synchronization signal and a beam reference signal;
a quasi-collocation (QCL) configuration with other signals and channels;
a set of dedicated resources and/or configuration for the at least one of a first random access message and a second random access message;
a subcarrier spacing, a preamble id, a cyclic shift, a power control parameter, a maximum number of retransmissions of the first random access message; or
a subcarrier spacing of the second random access message.

9. The method of claim 1, wherein determining the at least part of resources and configuration is based at least on one of:
an indication from an upper layer, an indication from a network, an indication from a second BS, measurements of the first BS, a set of pre-determined configurations, an indication from the at least one UE including at least one of a measurement report, a request, or a capability indication of the UE.

10. The method of claim 1, wherein providing the information to the at least one UE is based on transmitting at least one of:
a layer-1 signal, a media access control (MAC) control element (CE), a radio resource control (RRC) message, a broadcast channel, a control channel, or dedicated signaling.

11. The method of claim 1, wherein:
the at least part of resources and configuration are specific to the at least one UE or a plurality of UEs including the at least one UE.

12. The method of claim 1, wherein:
at least part of the second frequency band is non-overlapping with the first frequency band.

13. A method for wireless communication by a user equipment (UE), comprising:
communicating with a first base station (BS) in a first frequency band;
receiving, from the first B S, information of at least part of resources and configurations allocated for an assisted directional initial access that differ from configuration and resources allocated for non-assisted directional initial access for participating in at least one of an access or management procedure comprising the assisted directional initial access in a second frequency band, and
participating in at least one of an access or management procedures in the second frequency band.

14. The method of claim 13, wherein:
the at least one of an access or management procedure further comprises at least one of beam management, mobility management, radio resource management (RRM), or radio link monitoring (RLM); and
the signaling comprises at least one of a directional synchronization signal including a primary synchronization (PSS), a secondary synchronization signal (SSS), a tertiary synchronization signal (TSS), a timing or frequency refinement signal (TRS), a demodulation reference signal (DMRS) for a synchronization channel, a beam reference signal, a channel carrying at least part of a set of system information, or a random access message.

15. The method of claim 13, wherein:
the UE is configured to participate in the at least one of an access or management procedure in the second frequency band with a second BS; and
the signaling comprises at least one of a directional synchronization signal, a beam reference signal, a channel carrying at least part of a set of system information, a second random access message to be transmitted by the second BS, or a first random access message to be transmitted by the UE to the second BS.

16. The method of claim 15, wherein:
information comprises an indication to the UE whether it can use timing of the first BS to acquire at least part of timing of the second BS.

17. The method of claim 15, wherein the at least one of an access or management procedure comprises a contention-free random access procedure with the second BS.

18. The method of claim 15, further comprising:
at least one of processing or measuring one or more of a synchronization signal, beam reference signals, or a synchronization channel from the second BS;
transmitting a signal to the first BS indicating a result of the processing or measuring.

19. The method of claim 18, wherein the processing or measuring is based at least on the information received from the first BS.

20. The method of claim 18, wherein:
the UE receives at least part of the information after transmitting the signal to the first BS.

21. The method of claim 13, wherein:
the signaling comprises at least one of a directional synchronization signal, a beam reference signal, or a channel carrying at least part of system information; and
the information comprises at least one of a transmission periodicity, a beam sweeping periodicity, time and frequency resources used for transmission of the signaling, one or more measurement windows to receive and measure a synchronization signal or a beam reference signal, a set of synchronization signals or beam reference signals to measure within a measurement window, an indication of actually transmitted synchronization signals, information regarding quasi-collocation of a synchronization signal or a beam reference signal with other signals or channels, an indication of synchronization signal repetition within a beam sweeping period, subcarrier spacing, a sequence generation parameter for a synchronization signal, or a beam reference signal.

22. The method of claim 13, wherein:
the at least one of an access or management procedure comprises a random access procedure; and
the signaling comprises at least one of a first random access message to be transmitted by the UE or a second random access message to be transmitted to the UE.

23. The method of claim 22, wherein the information comprises at least one of:
an indication of association between the resources of the at least one of a first random access message and a second random access message with a set of at least one or multiple of a synchronization signal and a beam reference signal;
a QCL configuration with other signals and channels;
a set of dedicated resources and/or configuration for the at least one of a first random access message and a second random access message;
a subcarrier spacing, a preamble id, a cyclic shift, a power control parameter, a max number of retransmissions of the first random access message; or
a subcarrier spacing of the second random access message.

24. The method of claim 13, further comprising:
transmitting, to the first B S, an indication including at least one of a measurement report of one or multiple of synchronization signals and beam reference signals, a set of one or more cell identifiers of at least one other detected base station, a request, or a capability of the UE.

25. The method of claim 13, wherein the information is received from the first B S via at least one of:
a layer-1 signal, a media access control (MAC) control element (CE), a radio resource control (RRC) message, a broadcast channel, a control channel, or dedicated signaling.

26. The method of claim 13, wherein:
the at least part of resources and configuration are specific to the UE or a plurality of UEs including the UE.

27. An apparatus for wireless communication by a first base station (BS), comprising:
means for communicating with at least one user equipment (UE) in a first frequency band;
means for determining at least part of resources and configuration for the at least one UE for participating in at least one of an access or management procedure comprising an assisted directional initial access in a second frequency band; and
means for providing information about the resources and configuration allocated for the assisted directional initial access that differ from configuration and resources allocated for non-assisted directional initial access to the at least one UE for signaling to be transmitted as part of the access or management process.

28. An apparatus for wireless communication by a user equipment (UE), comprising:
means for communicating with a first base station (BS) in a first frequency band;
means for receiving, from the first BS, information of at least part of resources and configurations allocated for an assisted directional initial access that differ from configuration and resources allocated for non-assisted directional initial access for participating in at least one of an access or management procedure comprising the assisted directional initial access in a second frequency band; and
means for participating in at least one of an access or management procedures in the second frequency band.

* * * * *